Sept. 29, 1942.  R. S. DRUMMOND  2,297,611
CUTTER
Filed Dec. 12, 1939  3 Sheets-Sheet 1

INVENTOR.
ROBERT S. DRUMMOND
BY Whittemore, Hulbert
& Belknap
ATTORNEYS

Sept. 29, 1942.   R. S. DRUMMOND   2,297,611
CUTTER
Filed Dec. 12, 1939   3 Sheets-Sheet 2

INVENTOR.
ROBERT S. DRUMMOND
BY *Whittemore, Hulbert*
*& Belknap*   ATTORNEYS

Sept. 29, 1942.    R. S. DRUMMOND    2,297,611
CUTTER
Filed Dec. 12, 1939    3 Sheets-Sheet 3
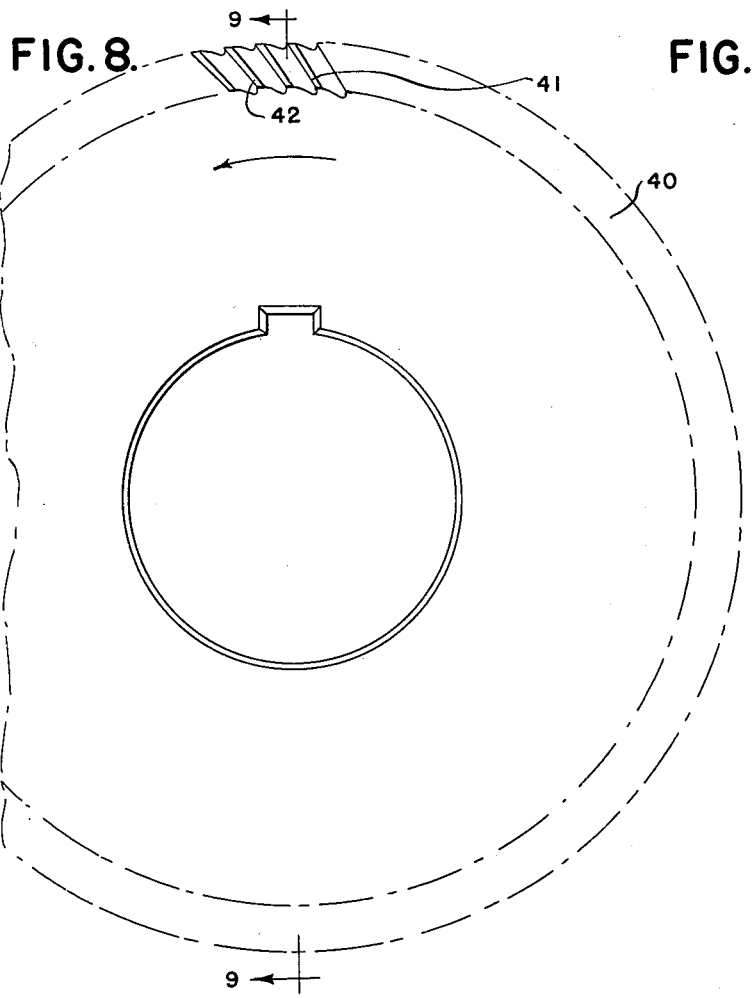
FIG. 8.
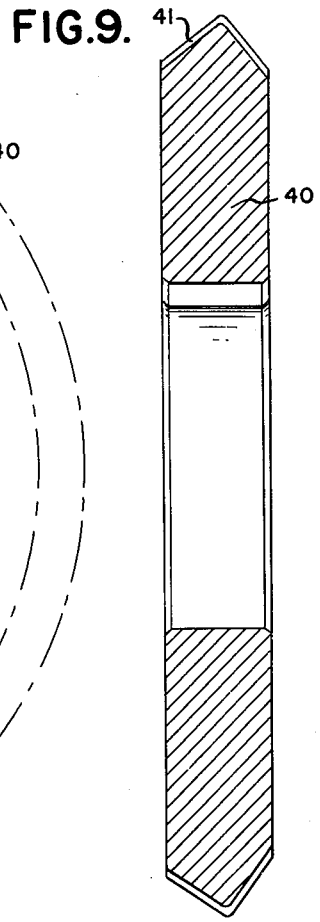
FIG. 9.
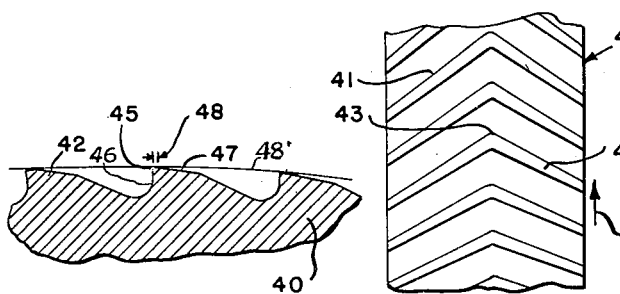
FIG. 10.
FIG. 11.
INVENTOR.
ROBERT S. DRUMMOND
BY Whittemore, Hulbert
& Belknap  ATTORNEYS Patented Sept. 29, 1942

2,297,611

UNITED STATES PATENT OFFICE 2,297,611

CUTTER

Robert S. Drummond, Detroit, Mich., assignor to National Broach & Machine Company, Detroit, Mich., a corporation of Michigan Application December 12, 1939, Serial No. 308,868

7 Claims. (Cl. 29—103)

The present invention relates to cutters and more particularly to rotary cutters for metal cutting. The present application is a continuation in part of my prior application, Robert S. Drummond, Serial No. 124,790, "Method of finishing surfaces and machine and cutter therefor," filed February 8, 1937.

According to the present invention, cutters of the type generally referred to as milling cutters are provided with a very narrow land directly in back of the cutting edge. This land of course occupies the enveloping surface of the tool. If the cutter is cylindrical, the land is cylindrical; and if the cutter is conical, the land is an unrelieved conical surface.

It has been found that the provision of the lands directly in back of the cutting edge substantially improves the operation of the tool, and does not as might be supposed reduce tool life. The land is extremely narrow, and there is no appreciable burnishing by this land surface.

It is evident that the omission of this land is harmful to the tool and results in inferior cutting, due to the fact that the cutting edge is in what may be termed an unsupported condition, and tends to plunge into the work. This results in chatter and in surface imperfections of the finished work. Where the land is provided the cutting edge is supported directly on the work to a very slight extent but sufficient to prevent chatter and to improve the finish of the work.

It is accordingly an object of the present invention to provide a cutter of the type described characterized primarily by the provision of a narrow unrelieved land directly in back of the cutting edge.

Other objects of the invention will be apparent as the description proceeds, and when taken in conjunction with the accompanying drawings wherein:

Figure 8 is a fragmentary side elevation of a modified form of cutter;

Figure 9 is a section on the line 9—9 of Figure 8;

Figure 10 is a fragmentary edge view of the cutter shown in Figure 8; and

Figure 11 is a fragmentary sectional view showing the tooth formation of this cutter.

Figure 1:
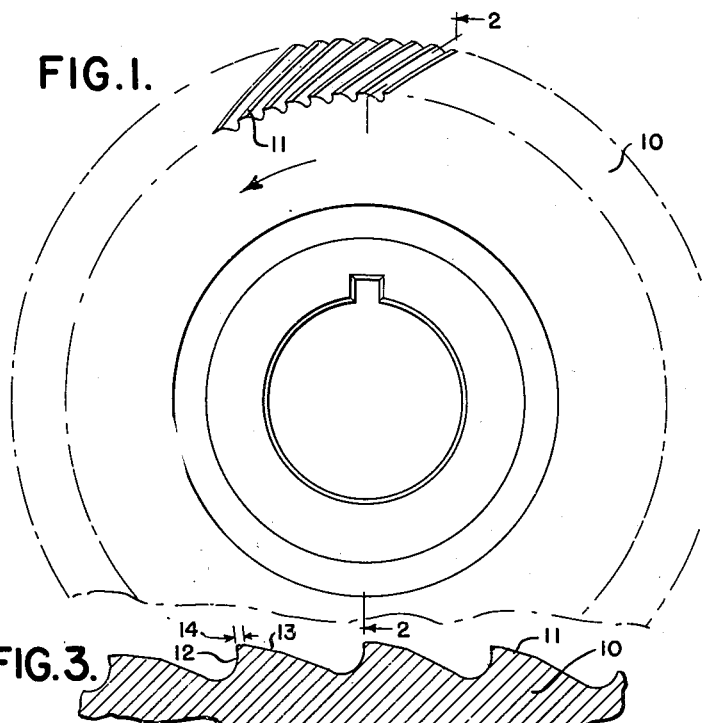
Figure 1 is a fragmentary side elevation of a relatively wide cutter made according to the present invention.
Figure 2:
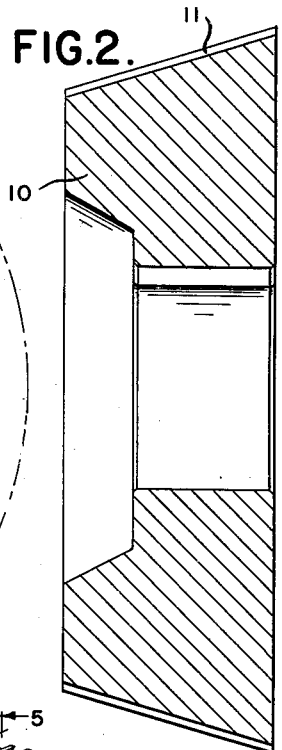
Figure 2 is a section on the line 2—2, Figure 1.
Figure 3:
Figure 3 is an enlarged fragmentary section illustrating the tooth formation.

Referring first to Figures 1 to 3 I have illustrated a relatively wide conical cutter 10 having a plurality of cutting teeth 11, each tooth provided, as is conventional in this type of cutter, with a front rake or hook 12, and top cutting clearance 13. In addition each tooth directly back of the cutting edge is provided with a very narrow unrelieved land indicated at 14 in Figure 3.

This land has been found to be effective although reduced to dimensions such that it is imperceptible to the naked eye. In practice I prefer to provide this land of the width of about .002 of an inch, but apparently for best results it should be less than .005 of an inch.

The cutter illustrated in Figure 1 is relatively wide, and preferably the teeth 11 formed thereon are of a curved or helical shape. The teeth are inclined, as indicated, and preferably the direction of inclination starting at the small end of the teeth is opposite to the direction of rotation. In other words, each cutting edge or tooth 11 will initiate its cut at the small end of the cutter and will form the chip towards the large end of the cutter. This results in increased chip clearance, since the chips are formed towards the large end of the cutter where the chips between the adjacent teeth become wider.

Figure 5:
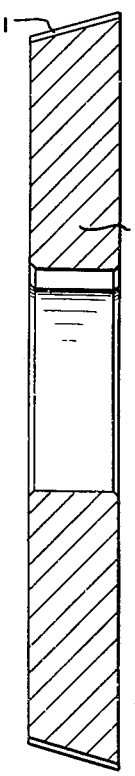
Figure 5 is a section on the line 5—5, Figure 4.
Figure 4:
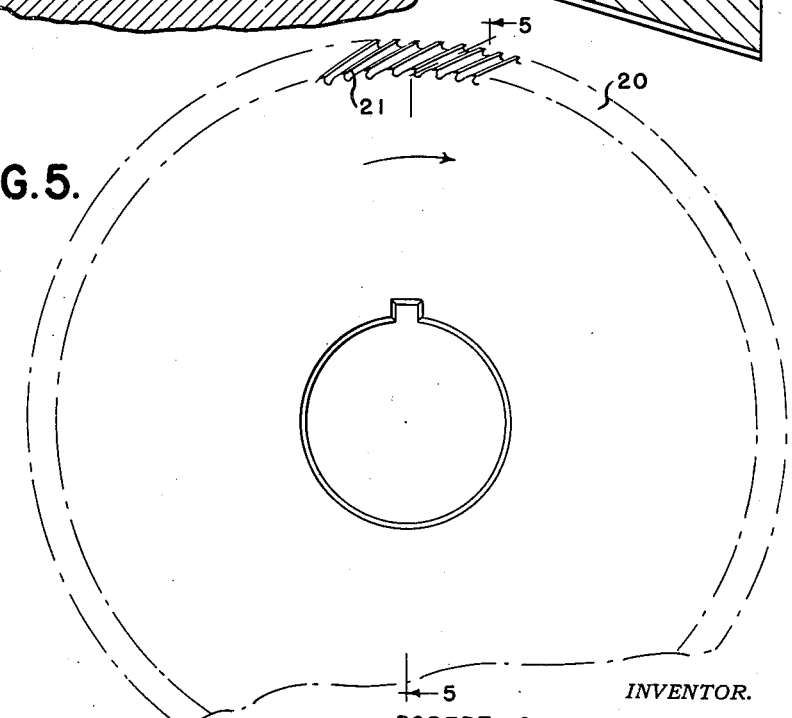
Figure 4 is a fragmentary side elevation of a narrow cutter embodying my invention.

Referring now to Figures 4 and 5, a similar cutter 20 is illustrated, having teeth 21, and the teeth in this cutter are also provided with a narrow unrelieved land directly in back of the cutting edge. The cutter 20 is substantially narrower than the cutter 10 in Figure 1, and in this cutter I have found it satisfactory to provide straight teeth extending diagonally across the edge of the cutter. In this figure I have illustrated the teeth 21 as inclined in the opposite direction, that is rearwardly from the large end of the cutter toward the small end of the cutter. This is necessary in cutters adapted to be used adjacent a shoulder so as to throw the chips away from the shoulder, although as above indicated, it is ordinarily preferred to provide the teeth in a manner to initiate their cut adjacent the small end of the cutter.

Figure 7:
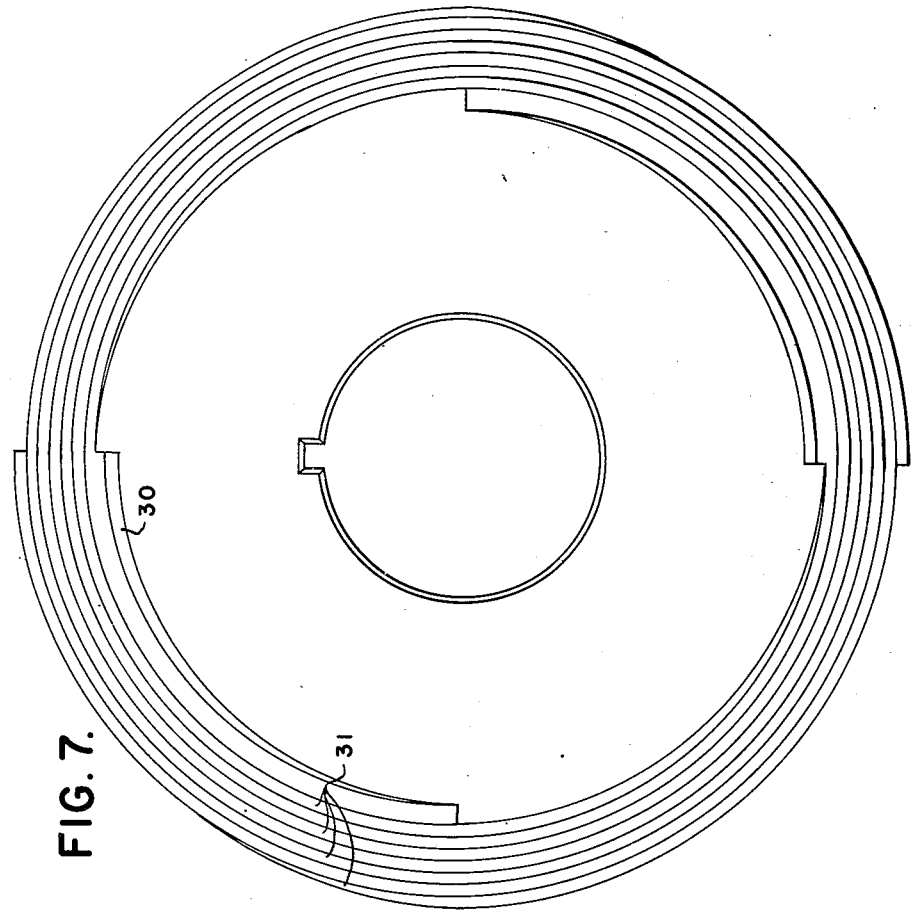
Figure 7 is a view of the cutter shown in Figure 6 taken from the right in this figure.
Figure 6:
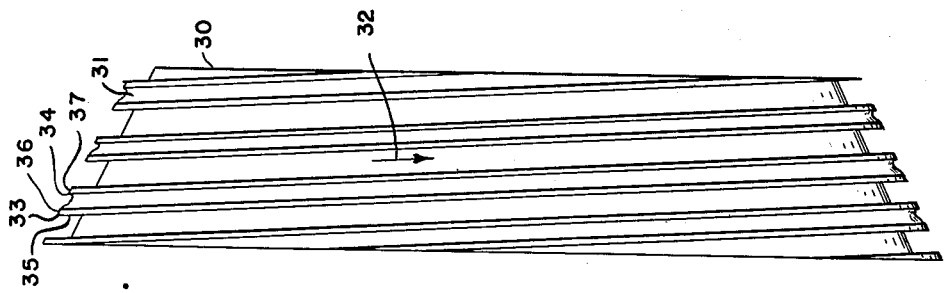
Figure 6 is a side view of a modified form of cutter made according to the present invention.

In Figures 6 and 7 I have illustrated a somewhat modified form of cutter 30. This cutter embodies the same principles as the cutter illustrated in Figures 1 and 4, and differs therefrom primarily in the provision of teeth which extend at a very great helix angle. The cutter illustrated in Figure 6 is conical, although the same construction may be applied to cylindrical or other forms of cutters.

This cutter is intended to be rotated in contact with a work piece, such for example as a rotary work piece in finishing a surface of revolution. The cutter is adapted to be rotated in the direction of the arrow 32 in Figure 6, which will cause the cutting edges to move relative to the work to the left in this figure. As indicated, each tooth 31 is provided with two cutting edges, namely a front cutting edge 33, and a second cutting edge 34. As indicated, the cutting edge 33 will have front rake as indicated at 35. Directly back of the cutting edges 33 and 34 are narrow unrelieved lands 36 and 37. While I have indicated each tooth 31 as provided with a pair of cutting edges 33 and 34, it will be evident of course that this arrangement is not necessary and that the teeth may have substantially the same cross-sectional shape as the teeth indicated in Figure 3.

As indicated in Figure 7, I have shown the cutter as provided with two separate teeth, each extending completely around the periphery of the cutter. This of course is illustrative only, and either more or less teeth may be provided, and the angularity of the teeth may vary widely from, for example, those shown in Figure 6 to those shown in Figures 1 and 4.

It has been proposed in the past to provide a combined finishing and shaving tool in which cutting edges are provided having an unrelieved cutting edge in back of the land in order to burnish the work such as illustrated in Patent 1,516,268. The present invention is distinguished from this type of tool, and the unrelieved land which characterizes the present tool performs no burnishing. The tool is a free cutting tool, and in operation may be distinguished from a conventional milling cutter only by the quietness of its operation and the superior finish imparted thereto. The narrow land in back of the cutting edge is entirely insufficient to provide a burnishing action and in fact does not prevent the tooth of the cutter from penetrating freely but in a controlled manner into the metal of the work piece.

In Figures 8 to 11 I have illustrated a somewhat modified form of cutter 40 in which the cutting edge 41 is V-shaped in cross section. As best seen in Figure 9, this tool is adapted to cut a V-shaped slot or groove in a work piece, and particularly in a rotary work piece. In order to provide chip disposal I incline the teeth 42 rearwardly to the direction of rotation from the point 43 of the teeth, as best indicated in Figure 10, in which figure the arrow 44 indicates the direction of rotation. Figure 11 ilustrates the formation of the teeth, and it will be observed that each tooth 42 has a cutting edge 45, rake as indicated at 46, top clearance as indicated at 47, and a narrow unrelieved land as indicated at 48.

Cutters of the type described herein are capable of application in conventional milling, but I have found them to be particularly suitable for the very accurate surface finishing operation performd by my surface finishing method described in my copending application Serial No. 124,790.

In this operation the cutter and work are both rotated at substantial speeds, and the cutter is fed into the work preferably in what is referred to as a plunge cut. The relative feed is reduced near depth, and when the tool reaches depth the parts are retained without further relative feed for a substantial interval to effect a fine finishing operation. In this operation the primary object is to obtain very accurate surfaces so as to avoid subsequent grinding operations, or if these are necessary, to reduce the amount of grinding to a minimum.

In general, the accuracy obtained by the shaving operation is such that no grinding is required. It will be understood that the cutter is adapted to operate on round or flat surfaces.

It has been found that cutters of the type described herein, namely those provided with a very narrow unrelieved land directly in back of the cutting edge, perform this operation very satisfactorily, and it has further been found that omission of this land results in surprisingly large errors which are attributable to nothing but the omission of the land.

The term "unrelieved land" is employed herein in its usual meaning, and defines a surface directly in back of the cutting edge which follows in the path of the cutting edge during rotation of the tool. Thus, where the cutting tool body is cylindrical, the lands are portions of the same cylinder. Where the tool body is frusto-conical, as in Figure 1, the unrelieved lands occupy portions of the cone. This condition is clearly illustrated in Figure 11 in which the peripheral bounding surface of the tool is indicated by the line 48'. The unrelieved land 48 occupies a portion of this surface. Rearwardly from this unrelieved land 48 the top portion of the tooth is relieved at 47. As a result of this construction, if the tool is rotated without relative feed, the surface of the unrelieved land 48 will bear lightly on the machined surface of the work piece.

While I have illustrated and described several specific embodiments of my invention, it will be apparent to those skilled in the art that various additions, modifications, omissions, combinations and substitutions may be made which will be within the spirit and scope of my invention as defined by the appended claims.

What I claim as my invention is:

1. A rotary, metal cutting tool of circular cross-section having inclined teeth provided with cutting edges, said teeth being provided with narrow, unrelieved lands back of the cutting edge, said lands having a width between .001 and .005 inch.

2. A rotary, metal cutting tool of circular cross-section having inclined teeth provided with cutting edges, said teeth being provided with narrow, unrelieved lands back of the cutting edge, said lands having a width on the order of about .002 inch.

3. A rotary, metal cutting tool comprising a generally conical body, inclined teeth on said body, said teeth being inclined rearwardly from the small end toward the large end of said tool, said teeth being of substantially uniform cross-section, thereby providing increased chip clearance space toward the large end of said cutter.

4. A rotary, metal cutting tool of circular cross-section having inclined teeth, each of said teeth having a forward cutting edge, a front surface inclined to provide rake, and a top surface, said top surface immediately back of said cutting edge being unrelieved to provide a narrow land and being relieved in back of said land to provide cutting clearance.

5. A rotary, metal cutting tool of circular cross-section having inclined teeth, each of said teeth having a forward cutting edge, a front surface inclined to provide rake, and a top surface, said top surface immediately back of said cutting edge being unrelieved to provide a narrow land and being relieved in back of said land to provide cutting clearance, said land having a surface of circular cross-section, the center of curvature being the axis of said tool, said land having a normal width of between .001 and .005 inch.

6. A rotary, metal cutting tool of circular cross-section having inclined teeth, each of said teeth having a forward cutting edge, a front surface inclined to provide rake, and a top surface, said top surface immediately back of said cutting edge being unrelieved to provide a narrow land and being relieved in back of said land to provide cutting clearance, said land having a surface of circular cross-section, the center of curvature being the axis of said tool, said land having a normal width of about .002 inch.

7. A rotary metal cutting tool of circular cross-section having a V-shaped periphery provided with cutting teeth, said teeth being inclined rearwardly from the direction of rotation on both sides of the vertex of the V, whereby said teeth initiate their cut at the V, and form chips toward the free ends thereof.

ROBERT S. DRUMMOND.